UNITED STATES PATENT OFFICE

BERNHARD SCHÖNER AND OTTO SIEBERT, OF DESSAU, ANHALT, GERMANY, ASSIGNORS TO ACTIEN GESELLSCHAFT FÜR ANILIN FABRIKATION, OF BERLIN, GERMANY.

AZO DYES.

1,408,405.  Specification of Letters Patent.  Patented Feb. 28, 1922.

No Drawing.    Application filed August 30, 1921. Serial No. 496,960.

*To all whom it may concern:*

Be it known that we, BERNHARD SCHÖNER and OTTO SIEBERT, citizens of the German Republic, residing at Dessau, in Anhalt, Germany, have invented certain new and useful Improvements in Azo Dyes, (for which I have made application in Germany, May 7, 1914; in England, April 6, 1915; in Austria, March 8, 1915; in Switzerland, March 26, 1915, in France, Feb. 7, 1920, and in Czecho-Slovakia, Feb. 16, 1920,) of which the following is a specification.

The objects of our present invention are new azo dyes as free acids corresponding to the general formula:

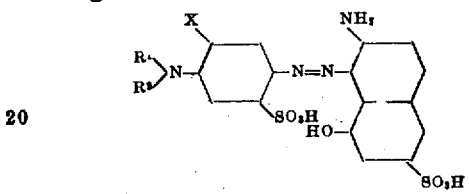

$R^1$, $R^2$ meaning substituents, such as hydrogen, alkyl-, aralkyl-, acidyl-groups, X meaning an univalent substituent.

Such dyes are obtained by coupling in acid medium 4-aminodiazobenzene-2-sulfonic acid derivatives with 2-amino-8-naphthol-6-sulfonic acid. The same dyes may be manufactured by combining 2-amino-8-naphthol-6-sulfonic acid with 4-nitrodiazobenzenesulfonic acid, by reducing the nitro group and by substitution of the resulting amino group in the desired manner. The new dyes form in the dry state dark powders soluble in water with bluish red color, less soluble in alcohol, unsoluble in ether and benzene. By reducing agents they are destroyed. They dye on wool bluish red tints of a very good fastness to the action of light and to washing and equalize in an excellent manner.

The following examples may serve to illustrate our invention without limiting it, the parts being by weight:

1. 26 parts of the 6-acetylamino-3-amino-1-methoxy-benzene-4-sulfonic acid are diazotized in the usual manner and united with 24 parts of 2-amino-8-naphthol-6-sulfonic acid which may be dissolved in an alkali and separated by addition of an acid in form of a fine precipitate. In order to finish the reaction sodium acetate is added. The resulting dye is salted out, filtered and dried. It forms in dry state a dark powder, soluble in water with reddish blue color, less soluble in alcohol, unsoluble in ether and benzene. By reducing agents it is destroyed. It dyes on wool blueish red tents of an excellent fastness to the action of light.

2. The dye which may be obtained by coupling of the diazo compound of 21.8 parts of 4-nitro-aniline sulfonic acid with 24 parts of 2-amino-8-naphthol-6-sulfonic acid and by reducing the nitro group is mixed with 400 parts of water and 250 parts of methyl alcohol. 12 parts of sodium carbonate and 20 parts of methyliodide are added; the mixture may be heated for 3 hours in an autoclave to 95-100° C. Then the methyl alcohol and the excess of methyliodide are eliminated by distillation and the dye is separated by common salt. It forms in the dry shape a dark powder, soluble in water with bluish red color, less soluble in alcohol, insoluble in ether and benzene. By strong reducing agents it is destroyed. It dyes wool beautiful blueish red tints of a very good fastness.

3. The sodium salt of the dye 4-aminoaniline-2-sulfonic acid-azo (1) 2-amino-8-naphthol-6-sulfonic acid (compare example 2) is treated in aqueous solution with the corresponding quantity of acetic anhydride. The dye is separated by addition of common salt. It forms in dry state a dark powder, soluble in water with blueish red color, less soluble in alcohol, unsoluble in ether and benzene. By strong reducing agents it is destroyed. It dyes wool in blueish red tints of very good fastness.

4. The solution of 50 parts of the sodium salt of the dye 3-aminoaniline-2-sulfonic acid-azo-(1) 2-amino-8-naphthol-6-sulfonic acid in 250 parts of water is heated to 75° C. and stirred with 60 parts of benzoyl chloride. In the course of an hour 10 parts of calcium carbonate are added. The mixture is stirred for an hour, the temperature being kept at 75° C. The dye is separated with common salt. In the dry state it forms a dark powder, soluble in water with blueish red color, less soluble in alcohol, unsoluble in ether and benzene. It is destroyed by strong reducing agents and dyes on wool blueish red tints of a very good fastness.

It is obvious to those skilled in the art that our invention is not limited to the foregoing examples or to the details given therein. Dyes of the same qualities are obtained by substituting the amino group by other substituents for instance by the benzyl-group or its derivatives.

Having now described our invention and the manner in which it may be performed what we claim is,—

1. The herein described new azo dyes, the general formula of the free acids being:

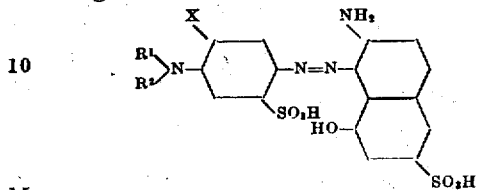

$R^1$, $R^2$ meaning substituents, such as hydrogen alkyl-, aralkyl-, acidyl-groups, X meaning an univalent substituent—being, in the dry state, dark powders, soluble in water to blueish red solution, from which wool is dyed blueish red, less soluble in alcohol, unsoluble in ether and benzene; being destroyed by reducing agents, yielding upon reduction 1.2-diamino-8-oxynaphthalene-6-sulfonic acid and a para-phenylenediamine-sulfonic acid derivative.

2. The herein-described new azo-dyes, the general formula of the free acid being:

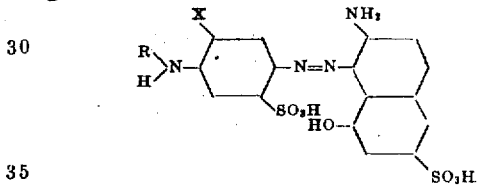

R meaning a substituent, such as hydrogen, alkyl-, aralkyl-acidyl-group, X meaning an univalent substituent—being in the dry state dark powders, soluble in water to blueish red solutions from which wool is dyed blueish red, less soluble in alcohol, unsoluble in ether and benzene, being destroyed by reducing agents, yielding upon reduction 1.2-diamino-8-oxynaphthalene-6-sulfonic acid and a para-phenylene sulfonic acid derivative.

3. The herein-described new azo dyes, the general formula of the free acid being:

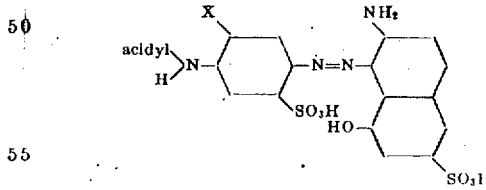

X meaning an univalent substituent—being in the dry state dark powders soluble in water to blueish red solutions, from which wool is dyed blueish red, less soluble in alcohol, unsoluble in ether and benzene, being destroyed by reducing agents yielding upon reduction 1.2-diamino-8-oxynaphthalene-6-sulfonic acid a monoacidylated para-phenylenediamine sulfonic acid derivative.

4. The herein-described new azo dyes, the general formula of the free acid being:

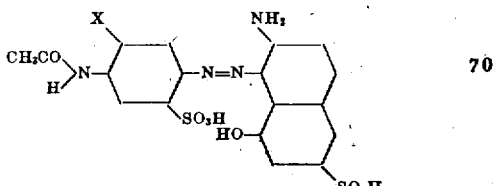

X meaning an univalent substituent—being in the dry state dark powders soluble in water to blueish red solutions, from which wool is dyed blueish red, less soluble in alcohol, unsoluble in ether and benzene being destroyed by reducing agents yielding upon reduction 1.2-diamino-8-oxynaphthalene-6-sulfonic acid and a monoacetylphenylenediamine sulfonic acid derivative.

5. The herein-described new azo dyes, the general formula of the free acid being:

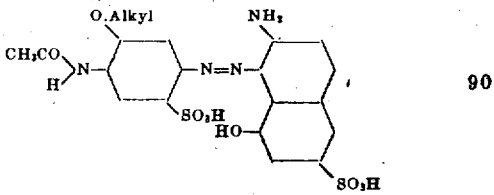

being in the dry state dark powders soluble in water to blueish red solutions from which wool is dyed blueish red, less soluble in alcohol, unsoluble in ether and benzene being destroyed by reducing agents, yielding upon reduction 1.2-diamino-8-oxynaphthalene-6-sulfonic acid and a 1-amino-4-monoacetylamino-5-alkyloxybenzene sulfonic acid (2).

6. The herein-described new azo dye, the general formula of the free acid being:

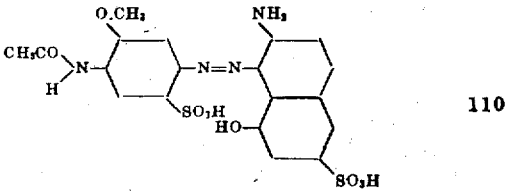

being in the dry state a dark powder soluable in water to a blueish red solution from which wool is dyed blueish red, less soluble in alcohol, unsoluble in ether and benzene, being destroyed by reducing agents yielding upon reduction 1.2-diamino-8-oxynaphthalene-6-sulfonic acid and 1-amino-4-monoacetylamino-5-methoxybenzene-2-sulfonic acid.

In testimony whereof we affix our signatures in presence of two witnesses.

BERNHARD SCHÖNER.
OTTO SIEBERT.

Witnesses:
LEO KERKOVIUS,
KARL SAMER.